Patented Apr. 23, 1940

2,198,153

UNITED STATES PATENT OFFICE 2,198,153

HYDROGENATION OF MALEIC ANHYDRIDE

Kenneth W. Coons, Tuscaloosa, Ala., assignor to National Aniline and Chemical Company, Inc., New York, N. Y., a corporation of New York No Drawing. Application March 13, 1936, Serial No. 68,687

6 Claims. (Cl. 260—341)

This invention relates to an improvement in the catalytic hydrogenation of maleic anhydride to succinic anhydride, and particularly to the liquid phase catalytic hydrogenation of maleic anhydride containing impurities which are catalyst poisons.

In the commercial manufacture of maleic anhydride by the catalytic oxidation of hydrocarbons, for example, benzene or the like, the exit gases from the oxidation zone, which contain maleic anhydride vapors together with impurities, may be passed into contact with organic solvents which extract the maleic anhydride therefrom, or the maleic anhydride vapors may be absorbed in water and recovered as maleic acid. Upon evaporation of the organic solvents and distillation of the residue, or upon dehydration of the maleic acid, a product is obtained which is known as technical or commercial maleic anhydride. Such commercial maleic anhydride usually contains impurities, for example, sulfur compounds and free acids which are active poisons for the catalytic materials commonly used in the hydrogenation of maleic anhydride to succinic anhydride. Attempts which have heretofore been made to hydrogenate technical maleic anhydride containing these catalyst poisons have been unsuccessful because of the fact that the catalyst is rapidly deactivated and becomes "spent" before a substantial amount of hydrogenation is accomplished. Accordingly, prior to the hydrogenation of the maleic anhydride it has been customary to treat it with substances adapted to remove the impurities, e. g., finely divided metals and the like.

I have now found, however, that commercial maleic anhydride containing such catalyst poisons may be rapidly and efficiently hydrogenated in the liquid phase in the presence of a hydrogenation catalyst, preferably finely divided nickel, by treatment of said maleic anhydride with hydrogen under superatmospheric pressure.

Crude liquid maleic anhydride and the catalytic material, preferably reduced nickel in finely divided form supported or not upon a suitable carrier, are placed in a suitable vessel provided with means adapted to vigorously agitate the liquid therein.

Normally an amount of hydrogen catalyst (excluding the weight of any catalyst carrier), between about 0.4 per cent and about 2.0 per cent by weight of the maleic anhydride being treated, is sufficient for rapid reduction; preferably about 1 per cent is used. The catalyst may be combined if desired with suitable activators, for example, copper.

Hydrogen gas or a gas mixture containing hydrogen may be admitted to the liquid reaction mass until the absolute pressure in the reduction vessel is between about 10 atmospheres and about 100 atmospheres, and preferably between about 14 atmospheres and about 36 atmospheres. In this connection it may be noted that if a catalyst of low activity is used, if the maleic anhydride is exceptionally impure, or if the hydrogen is diluted with inert gas, the pressure of reducing gas used may be increased to overcome the retarding influence of this factor. It has been found that most efficient results are obtained by the use of substantially pure hydrogen gas, although the process may be effected successfully by means of mixtures of gases containing free hydrogen, provided the amount of hydrogen therein is greater than about 10 per cent by volume, and the other constituents are inert to the materials involved in the reaction.

When the preferred pressure is obtained within the reaction vessel, the temperature of the maleic anhydride therein is raised to between about 150° C. and about 200° C. and preferably to about 180° C. and the reaction mixture is vigorously agitated to bring the maleic anhydride into intimate contact with the hydrogen. The pressure within the reduction vessel may be maintained by admitting thereto additional hydrogen or suitable gas mixture which contains free hydrogen, as hydrogen within the vessel is consumed in the hydrogenation reaction. This procedure is continued until absorption of hydrogen ceases, indicating that the hydrogenation is complete. (This stage may occur after about 4 to about 6 hours from the beginning of the hydrogen absorption.) At the end of the reaction the mass may be distilled to remove the succinic anhydride therefrom. Alternatively the mass may be cooled, care being taken to maintain the temperature of the mass above the melting point of succinic anhydride (i. e., 119.6° C.), the pressure within the reduction vessel may be reduced to that of the atmosphere, and, by filtration, the succinic anhydride may be separated as the filtrate from the suspended catalyst material.

The following example is given to illustrate the process of the present invention, the parts referred to therein being by weight:

*Example.*—300 parts of technical maleic anhydride were liquefied and 15 parts by weight of a reduced nickel catalyst, consisting of about 3 parts of metallic nickel distributed on a kieselguhr base, were placed in a suitable reduction vessel adapted to withstand high pressure, and hydrogen was introduced into the molten maleic anhydride until a pressure of 14 atmospheres absolute was obtained. The contents of the reduction vessel were then heated to 180° C. and thoroughly agitated while maintaining the initial pressure by introducing more hydrogen as the reaction proceeded. At the end of about 4 hours the reaction was complete, as indicated by no drop in pressure in the reaction vessel after the stream of hydrogen was cut off. The pressure within the reaction vessel was then released, the temperature of the molten succinic anhydride reduced to below 150° C. but above 120° C., and the mass filtered to separate suspended catalyst material therefrom. The crude succinic anhydride was purified by distillation in vacuo and a product obtained which had a melting point of 118.5° C. The yield was about 88 per cent of the weight of the maleic anhydride used.

By the process of this invention crude maleic anhydride may be efficiently and rapidly converted into succinic anhydride without the necessity of first removing impurities which are poisons for the catalysts usually used in the hydrogenation. The use of high pressure furthermore has the advantage that a considerable shortening of the duration of the reaction may be obtained by virtue of the higher concentration of hydrogen in the sphere of reaction, and in addition the use of pressure permits a choice, within an extended range of temperatures, of that temperature at which a given catalyst achieves its maximum activity while at the same time the anhydrides remain in the liquid state.

I claim:

1. In the hydrogenation of maleic anhydride containing impurities which are catalyst poisons, the improvement which comprises contacting said maleic anhydride in liquid phase with a hydrogenation catalyst and hydrogen at a pressure between about 10 and about 100 atmospheres absolute.

2. In producing succinic anhydride from maleic anhydride containing impurities which are catalyst poisons, the improvement which comprises agitating said maleic anhydride in molten state, in the presence of a nickel catalyst, with hydrogen at a pressure between about 14 and about 36 atmospheres absolute.

3. A method for producing succinic anhydride from a crude maleic anhydride obtained by the catalytic oxidation of benzene, which comprises contacting the crude maleic anhydride in liquid phase with a finely divided reduced nickel catalyst and hydrogen at a pressure between about 10 and about 100 atmospheres absolute and at a temperature between about 150° and about 200° C.

4. A method for the hydrogenation of maleic anhydride containing impurities which are catalyst poisons, which comprises agitating said maleic anhydride in molten state in the presence of an amount of a finely divided reduced nickel catalyst equal to from about 0.4 to about 2.0 per cent by weight of the maleic anhydride with hydrogen at a pressure between about 14 and about 36 atmospheres absolute and at a temperature between about 150° and about 200° C.

5. A method for producing succinic anhydride from crude maleic anhydride obtained by the catalytic oxidation of benzene which comprises contacting the crude maleic anhydride in molten state with a reduced nickel catalyst and hydrogen at a pressure between about 10 and about 100 atmospheres absolute and at a temperature between about 150° and about 200° C.

6. A method for producing succinic anhydride from crude maleic anhydride obtained by the catalytic oxidation of benzene, which comprises contacting the crude maleic anhydride in molten state with a reduced nickel catalyst and hydrogen at a pressure between about 14 and about 36 atmospheres absolute and at a temperature between about 150° and about 200° C.

KENNETH W. COONS.